(12) United States Patent
Kjoller et al.

(10) Patent No.: US 8,177,422 B2
(45) Date of Patent: May 15, 2012

(54) TRANSITION TEMPERATURE MICROSCOPY (75) Inventors: Kevin Kjoller, Santa Barbara, CA (US); Khoren Sahagian, Burbank, CA (US); Doug Gotthard, Carpinteria, CA (US); Anthony Kurtz, Sanat Barbara, CA (US); Craig Prater, Santa Barbara, CA (US); Roshan Shetty, Westlake Village, CA (US); Michael Reading, Norwich (GB)

(73) Assignee: Anasys Instruments, Santa Barbara, CA (US)

( * ) Notice: Subject to any disclaimer, the term of this patent is extended or adjusted under 35 U.S.C. 154(b) by 474 days.

(21) Appl. No.: 12/228,877

(22) Filed: Aug. 15, 2008

(65) Prior Publication Data

US 2010/0042356 A1 Feb. 18, 2010

(51) Int. Cl.
*G01N 25/00* (2006.01)
*G01K 3/00* (2006.01)
*G01K 7/00* (2006.01)

(52) U.S. Cl. .......... 374/16; 374/137; 374/164; 374/166; 374/167

(58) Field of Classification Search .................... 374/16, 374/137, 164, 166, 167
See application file for complete search history.

(56) References Cited

U.S. PATENT DOCUMENTS

| | | | |
|---|---|---|---|
| 6,185,992 B1* | 2/2001 | Daniels et al. | 250/307 |
| 6,200,022 B1* | 3/2001 | Hammiche et al. | 374/46 |
| 6,405,137 B1* | 6/2002 | Reading | 702/22 |
| 6,491,425 B1* | 12/2002 | Hammiche et al. | 374/43 |
| 6,805,839 B2* | 10/2004 | Cunningham et al. | 422/82.12 |
| 7,448,798 B1* | 11/2008 | Wang | 374/183 |
| 2002/0126732 A1* | 9/2002 | Shakouri et al. | 374/130 |
| 2002/0196834 A1* | 12/2002 | Zaldivar et al. | 374/22 |
| 2004/0026007 A1* | 2/2004 | Hubert et al. | 156/64 |
| 2004/0202226 A1* | 10/2004 | Gianchandani et al. | 374/185 |
| 2005/0105097 A1* | 5/2005 | Fang-Yen et al. | 356/497 |
| 2006/0243034 A1* | 11/2006 | Chand et al. | 73/104 |
| 2007/0263696 A1* | 11/2007 | Kjoller et al. | 374/31 |
| 2009/0032706 A1* | 2/2009 | Prater et al. | 250/307 |
| 2009/0229020 A1* | 9/2009 | Adams et al. | 850/33 |
| 2009/0249521 A1* | 10/2009 | Dazzi et al. | 850/33 |
| 2009/0260113 A1* | 10/2009 | Rice et al. | 850/33 |
| 2011/0078834 A1* | 3/2011 | King | 850/9 |

* cited by examiner

*Primary Examiner* — Lisa Caputo
*Assistant Examiner* — Mirellys Jagan
(74) *Attorney, Agent, or Firm* — Mark Rodgers (57) ABSTRACT A system and method for automatic analysis of temperature transition data over an area of a sample surface. The system relies on the use of a microfabricated probe, which can be rapidly heated and cooled and has a sharp tip to provide high spatial resolution. The system also has fast x-y-z positioners, data collection, and algorithms that allow automatic analysis of and visualization of temperature transition data.

18 Claims, 8 Drawing Sheets

TRANSITION TEMPERATURE MICROSCOPY

BACKGROUND OF THE INVENTION

This invention relates to a novel form of microscopy that allows high resolution mapping of thermal transitions of materials. Measurement of thermal properties of materials is critical to the development of novel materials, including polymers and pharmaceuticals. Understanding the performance of materials at different temperatures is essential for applications like automotive components, construction materials, food packaging, consumer electronics, drug delivery and many others. A key aspect of a material's thermal performance is provided by its thermal transition temperatures, for example rubber/glassy transitions, and melting transitions. Many composite materials are manufactured with micro and nanoscale blends of different materials, for example plastic materials for stiffness and rubbery materials for energy absorption. Conventional techniques for imaging these materials includes TEM and Atomic Force Microscopy (AFM). In AFM, phase imaging, as described in U.S. Pat. No. RE36,488 is commonly used to distinguish different materials in a multicomponent blend. While phase imaging has been very successful for distinguishing some materials from each other, it is primarily sensitive to differences in mechanical properties, for example friction, adhesion, viscoelasticity and stiffness. In many cases, it is difficult to attribute the contrast to a quantifiable physical property. And in some cases little or no contrast exists between materials, even when the materials have very different chemical and thermal properties. These materials may, however, have different thermal transition temperatures.

Bulk thermal analysis is a widely used technique. Techniques like differential scanning calorimetery (DSC) are widely used to measure thermal transitions. DSC, however, is performed on bulk samples and the transitions measured are not spatially differentiated. For this reason, extensive research has been performed on local measurements of thermal phase transitions using heated probe tips. Micro Thermal Analysis employed Wollaston wire cantilever probes and measured thermal transitions on the scale of many microns. Nano Thermal Analysis (NanoTA) employs sharp probes typically microfabricated out of silicon based materials to measure transition temperatures over regions on scales of less than 100 nm. Conventional micro and nano thermal analysis measurements, however are measured manually at single points or a handful of points without the ability to spatially resolve detailed variations in thermal transition temperatures. As such, no current technique provides high resolution images of transition temperatures.

BRIEF SUMMARY OF THE INVENTION

Transition temperature microscopy allows high resolution measurements of the thermal phase transitions that occur in many materials. Based on probe microscopy and nanothermal analysis, transition temperature microscopy allows scientists and engineers to reveal surface structure of materials on scales from centimeters to nanometers by automatically measuring and identifying temperatures at which thermal phase transitions (e.g. glass transition temperatures and/or melting points) occur. These thermal phase transition temperatures give critical information about material structure and composition. Transition temperature microscopy can be used to identify different material components in a composite blend, identify amorphous and crystalline regions, and identify different drug polymorphs, along with many other applications.

BRIEF DESCRIPTION OF THE DRAWINGS

The invention will be better understood by referring to the following figures.

DETAILED DESCRIPTION OF THE INVENTION

This invention provides high resolution microscope images of thermal transition temperatures.

Figure 1:
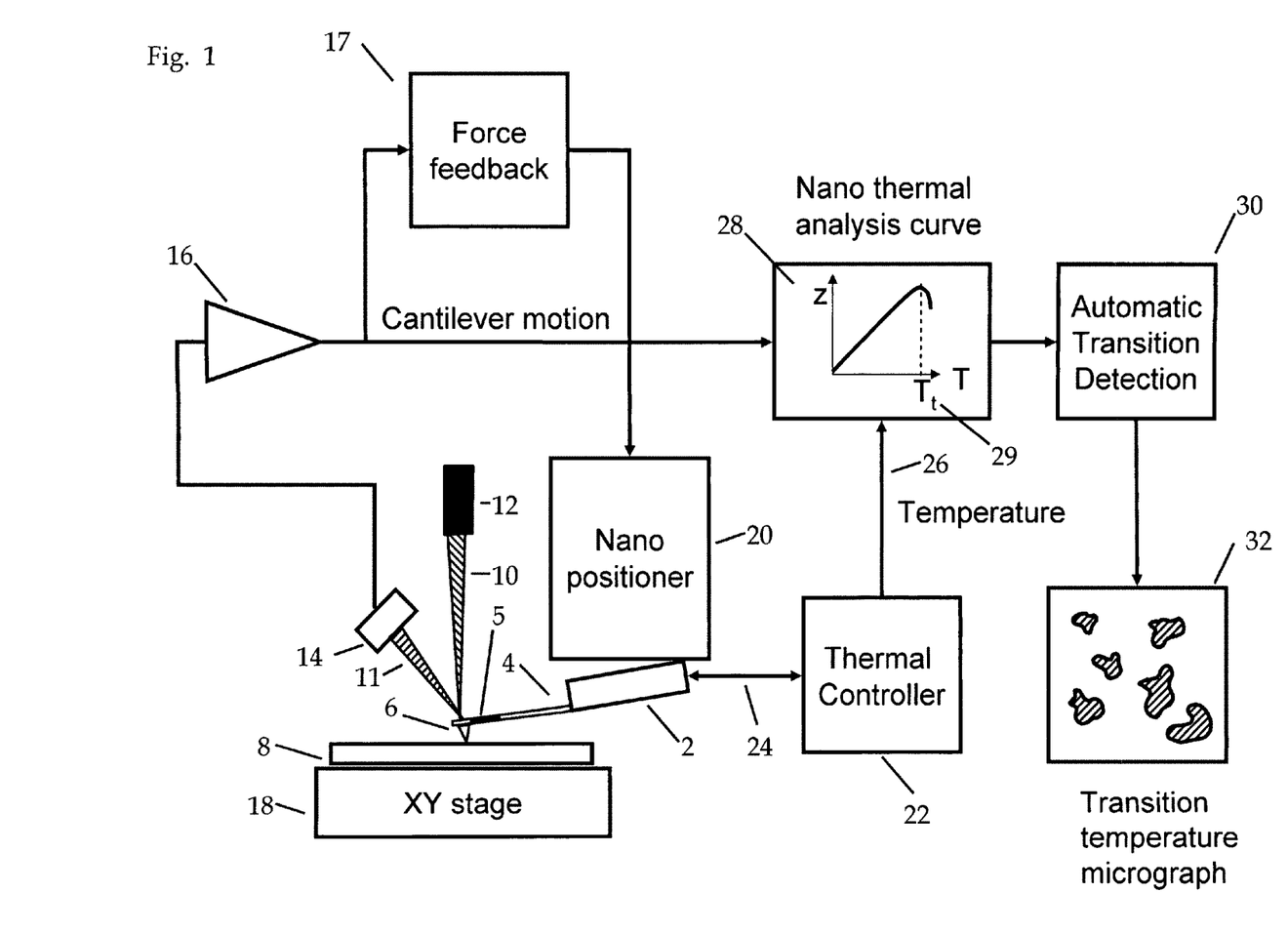
FIG. 1 is a simplified schematic diagram of an apparatus for transition temperature microscopy.

FIG. 1 is a simplified schematic diagram of an apparatus for transition temperature microscopy. A probe 2 comprising a cantilever 4 and a heatable probe tip 6 is brought close to a surface of sample 8. Thermal controller 22 supplies a control signal to a heater region 5 of the probe. A portion of the heat from the probe flows from the probe tip 6 into the sample 8. The increase in sample temperature causes a detectable probe data signal sensed by the probe. In one embodiment the detected probe data signal is the motion of the cantilever. In this embodiment, the temperature rise of the sample may cause a thermal expansion of the sample. This thermal expansion may be detected by recording a change in the bend, vertical position, and/or oscillation of the cantilever. One simple method is to record the deflection of the cantilever 4 as a function of the applied heater control signal 24. The cantilever deflection can be measured in many ways, the most common being to use the optical lever deflection method. In this scheme a light beam 10 from a light source 12 is directed to the backside of the cantilever 4 and the reflected beam 11 is directed toward a position sensitive detector 14. Analog and/or digital electronics 16 conditions the photodiode signal to create a signal indicative of the cantilever deflection and/or oscillatory motion.

The cantilever motion can also be measured using alternative techniques to the optical lever arm, including but not limited to interferometric, thermal, piezoresistive, piezoelectric, capacitive, and/or inductive readout schemes. The non-optical techniques, especially piezoresistive and thermal sensors can be directly integrated into the same probe 2 as the heater element. Demonstrations of the use of thermal detection of cantilever motion have been demonstrated by Prof. William King and coworkers. Any detection system that can create a signal indicative of the cantilever motion on the scale of 10s of nanometers may be sufficient. The probe data signal may also be due to the cantilever bend, cantilever oscillation, including any combination of oscillation amplitude, phase, and/or frequency. Monitoring thermophysical quantities like heat loss or thermal conductivity can also be used to create a signal indicative of the motion of the cantilever.

By monitoring probe 2, the thermal controller 22 additionally generates a signal 26 that is indicative of the temperature of a region of the probe. In the most common mode of operation, the temperature is sensed by measuring the electrical resistance of the heater region. This resistance has a temperature dependence that can be easily calibrated as a function of the probe temperature. Calibration samples with known melting points are often used to determine the relationship between the heater control signal and the tip temperature.

The probe temperature and resulting cantilever motion can be combined to create a nanothermal analysis (nanoTA) curve 28. This curve can be rich with information about the sample, containing for example the positions of thermal transition temperatures 29. The curve also carries information about other thermophysical properties of the sample including thermal expansion, heat capacity, thermal conductivity and thermal diffusivity.

For transition temperature microscopy (TTM), the nanoTA curve is analyzed to detect thermal transitions, e.g. glass transitions, softening transitions, melting transitions and even vaporization of highly local portions of the sample. It can also detect onset transition temperatures associated with the thermal initiation of chemical reactions, including synthesis and decomposition.

These thermal transition temperatures can be automatically detected and identified using the current invention and then mapped spatially to create a transition temperature microscope (TTM) image 32. Automatic transition detection algorithms 30 are used to analyze a plurality of nanoTA curves 28. This analysis is repeated at a plurality of points on a sample, addressed by moving the sample 8, the probe 2, or a combination of both. Pixels in the TTM image are typically color coded on the basis of a thermal transition 29 to aid in the visualization of thermal inhomogeneities in the sample.

To create the transition temperature microscope images, relative motion between the probe and sample can be created by motorized positioning stage 18. In FIG. 1, this stage is shown moving the sample, but it can work equally well moving the probe. Motorized stages are convenient for moving the sample on scales from 10s of nanometers to many centimeters. Suitable motorized stages can include dovetail slides, cross-roller bearing stages, air bearing stages, drag stages and piezoelectric inertial drives, for example. Additionally or alternately, it is possible to employ a nanopositioner 20 to generate relative motion between the probe and sample. Nanopositioners, which may also be called scanners, often employ piezoelectric devices to move the probe and/or sample to generate relative motion between the probe and sample. Such nanopositioners may include piezo tubes, piezo stacks, flexures, along with position sensors and/or other components to control and direct the motion. Alternative nanopositioners may employ other positioning means including electrostatic, electrostrictive, magnetostrictive, magnetic and inductive drive arrangements. Suitable nanopositioners will typically have ranges on the scale of 10s to hundreds of microns and often have a positioning sensitivity of better than 10 nm. Suitable nanopositioners are made for example by Physike Instrument, npoint, PiezoMechanik, Piezosystems Jena and many others.

Figure 2:
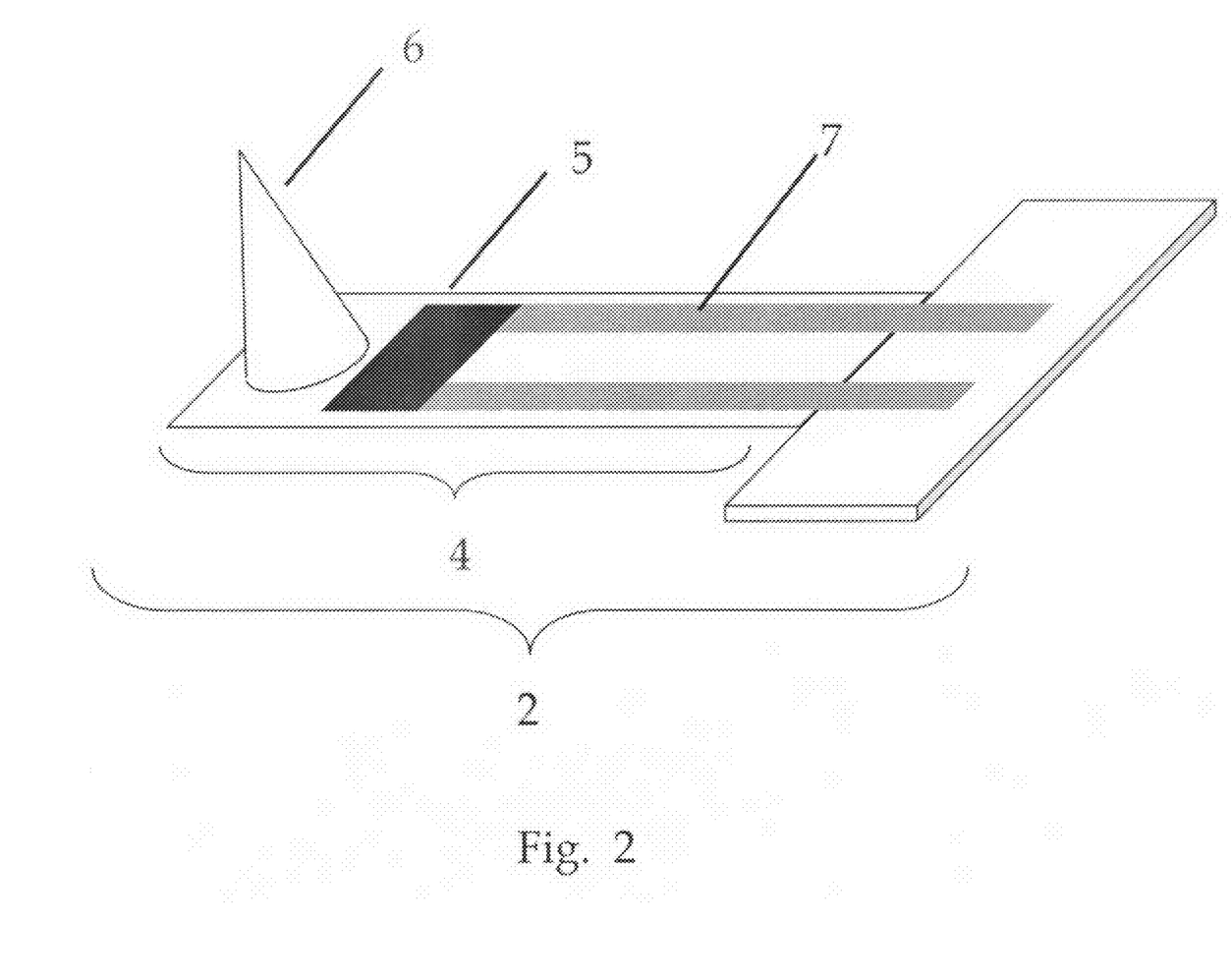
FIG. 2 is a simplified schematic diagram of a nanothermal analysis probe used for transition temperature microscopy.

Local heating of the sample may be achieved with heatable cantilever probes, as shown in FIG. 2. FIG. 2 is a simplified schematic diagram of a nanothermal analysis probe used for transition temperature microscopy. In one embodiment, the heatable cantilever probe comprises a microfabricated cantilever 4 with a sharp tip 6. Cantilever 4 and sharp tip 6 may be similar to those used for atomic force microscopy. Typical cantilever lengths range from 10-1000 um, with widths from 5-100 um, and thicknesses from 10s of nm to a few microns. Tip 6 may have an end radius less than 30 nm for high resolution work, or may have a tip radius of 1 um or more for lower resolution work and longer tip lifetime. The probe tip 6 may be heated using resistive heating by passing a current through the cantilever. A heater region 5 is typically disposed near the free end of cantilever 4 and adjacent to or collocated with probe tip 6. In one embodiment, the cantilever is microfabricated from semiconductor materials and heater region 5 is comprised of a lightly doped region of the cantilever. One suitable embodiment is described in copending application Ser. No. 11/405,772 assigned to the current assignee and is incorporated by reference. It is often desirable to provide a high resistance heater region that is connected to lower resistance leads 7. The high resistance heater region 5 is typically adjacent to or collocated with the probe tip such that the heat generation is substantially concentrated near the tip. Alternative heaters may be patterned from thin films of metallic, conducting and/or semiconducting materials. Alternatively, the probe may be heated remotely using for example a laser focused on the backside of the cantilever. In this embodiment, it may be desired to coat the cantilever with a coating that is highly absorbent to the radiation incident on the cantilever. This form of heatable cantilever can provide advantages of resistively heated cantilevers since electrical connections to the probe may not be required. The radiation emitted and/or absorbed by the probe can be used as an indicator of probe temperature. Alternately, the cantilever may include two materials such that it responds to changes in temperature with bimorph bending that can be detected in the probe motion.

Figure 3:
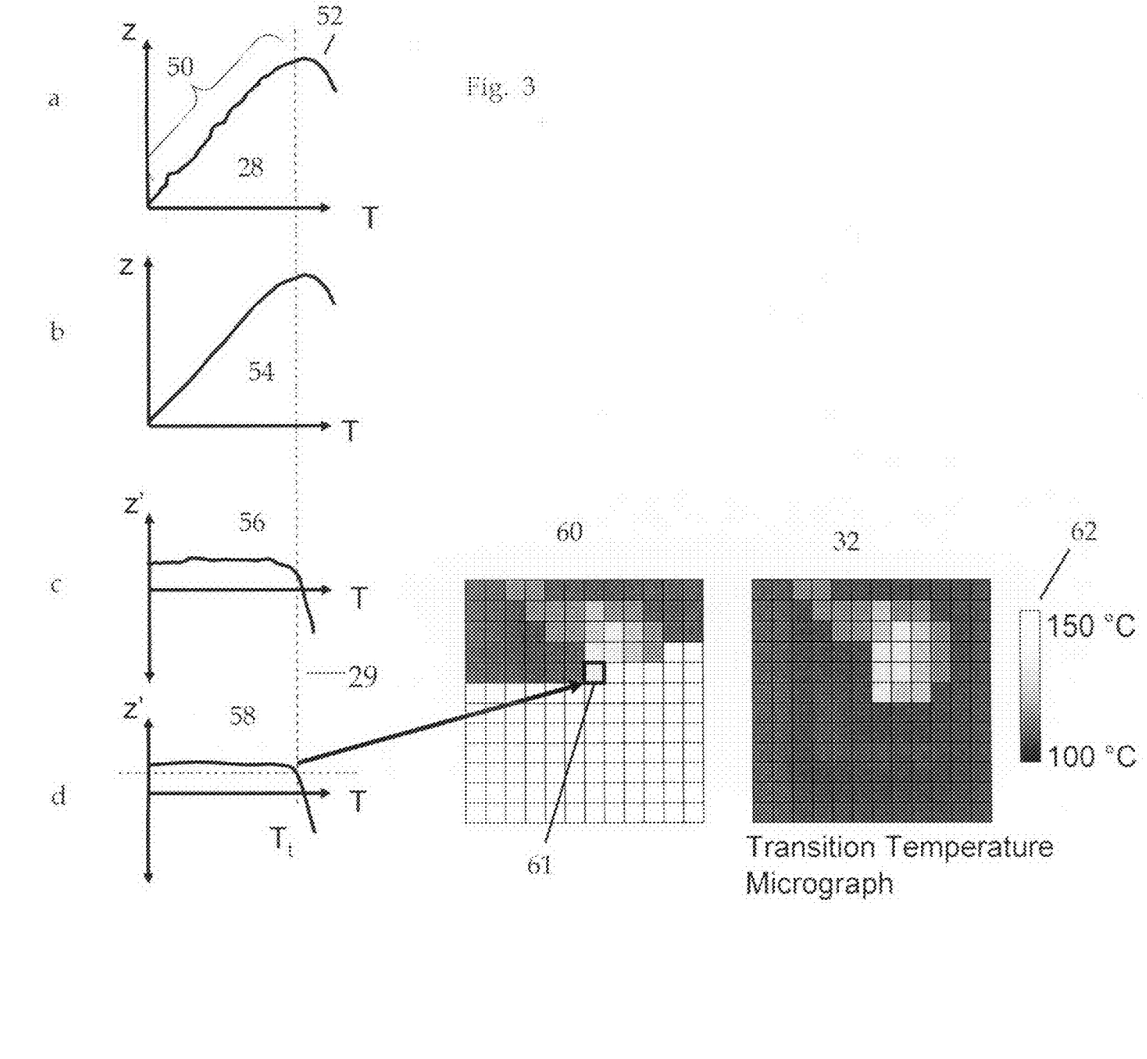
FIG. 3 is an example of automated determination of a local thermal transition temperature.

FIG. 3 is an example of automated determination of a local thermal transition temperature. In this example, the nanoTA curve comprises cantilever deflection measured as a function of probe temperature. Starting with FIG. 3a, the nanoTA curve 28 in this case comprises a ramp region 50 followed by a transition region 52. The nanoTA curve 28 also shows noise which can complicate the detection of the transition temperature. For this reason, the nanoTA cure 28 may be optionally filtered or otherwise smoothed to create a smoothed nanoTA 2 curve 54 in 3b. The derivative of either curves 28 or 54 is then calculated as shown schematically in FIG. 3c. Taking a derivative of a signal with noise may result in a noisy signal, so the derivative signal 56 in FIG. 3c may also be filtered or smoothed resulting in a smoothed derivative signal 58. Many filtering and smoothing techniques may be suitable, for example polynomial fits, cubic splines, low pass filters and median filters. Many other smoothing filters will also produce suitable results. The main goal is to suppress enough of the noise such that the transition detection algorithm is not unduly burdened with false transition detections.

The derivative signal 56 or 58 is then analyzed to detect one of more transition temperatures. The simplest technique is to determine when the derivative crosses zero, indicating a slope change from positive to negative in the nanoTA plot 28. Alternatively, it is possible to set the derivative threshold at an arbitrary value above or below zero but typically less than the slope during the ramp region 50. It is possible for certain materials to detect multiple transitions, for example detecting both a glass transition and a melting transition. These or similar algorithms for detecting transitions can be operated on a digital computation device, for example including a computer, a field programmable gate array, a digital signal processor, or other such devices capable of performing digital computation.

Once one or more transitions have been detected, the transition temperature $T_t$ 29 is recorded. Additionally, to provide a spatial map of the transition temperatures, image pixels (e.g. 61) may be color coded according to the recorded transition temperature. Assembling an array of color coded pixels at a plurality of relative tip-sample positions results in a spatially resolved transition temperature microscope image 32.

Figure 4:
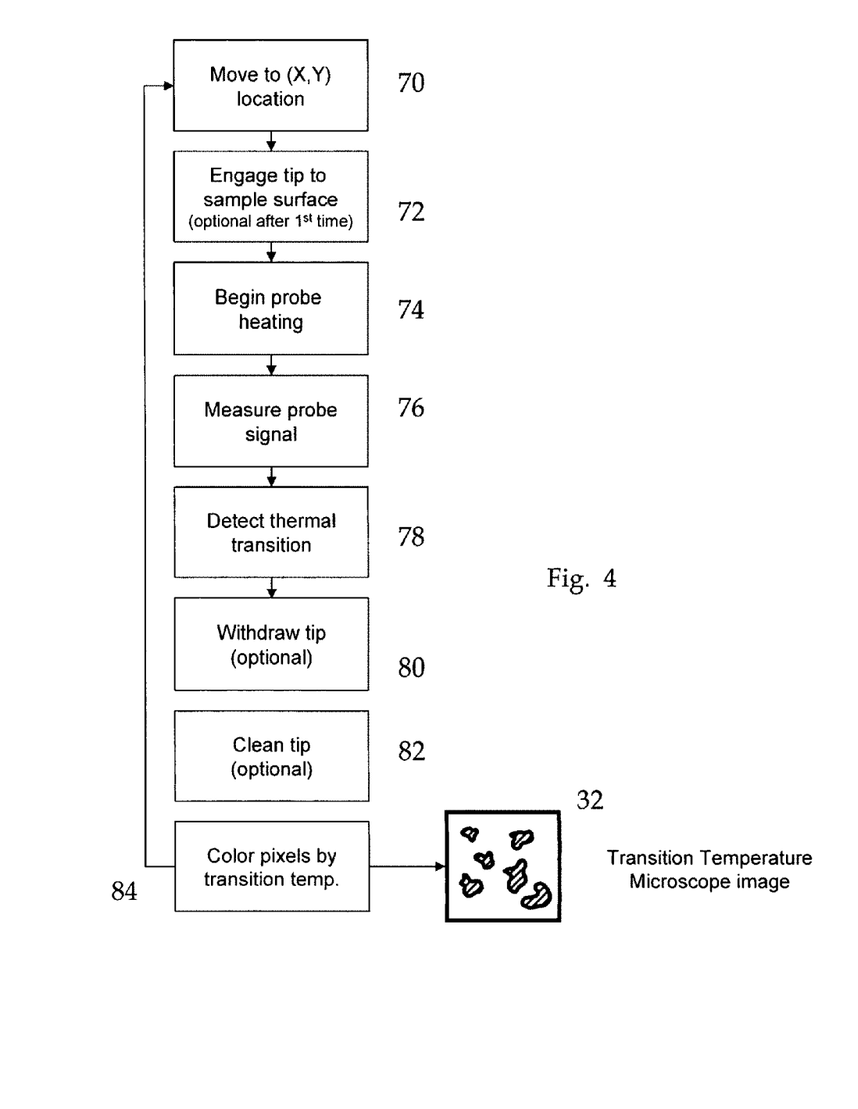
FIG. 4 is a simplified schematic diagram of a process flow for transition temperature microscopy.

FIG. 4 is a simplified schematic diagram of a process flow for transition temperature microscopy. The process typically begins at step 70 where the probe is moved to a desired location on the sample. As mentioned before, this positioning can be achieved by moving the sample, the probe or a combination of both. It can also be achieved using a motorized positioner and/or a nanopositioner or scanner device. Once the probe tip is in the vicinity of the region to be studied, the probe tip is engaged (step 72) such that it begins interacting with the sample. In the simplest case, this interaction comprises direct contact between the probe tip and the sample. Alternatively, the probe can be interacted with the probe in a more gentle fashion, for example including tapping/intermittent contact mode, non-contact mode and/or other oscillating tip modes. The step 72 of engaging can also be accomplished using a motorized translation stage, a nanopositioner or combination thereof. In a preferred embodiment step 72 occurs in less than one second and more preferably in less than 0.1 second. Next the probe is heated in step 74. During the probe heating, one or more probe signal is recorded during step 76. Probe signals can include probe deflection, position, temperature, resistance, heat flow, voltage or other signals indicative of the probe motion and/or thermal response. Either during the ramp or after the completion of a ramp, the probe data is analyzed in step 78 to detect one or more thermal transitions. The detection of a thermal transition may optionally abort the probe heating begun in step 74. The value of the thermal transition detected is used to color code the pixels (step 84) of the TTM image 32. This process is repeated for a plurality of (X,Y) locations on a sample until a spatially resolved image of the local transition temperatures are accumulated. Note that images of different transition temperatures may be accumulated simultaneously, for example creating one image of glass transition temperatures, one image of melt transition temperatures. It is generally convenient to color code a pixel a default color (e.g. black) when no transition is detected. Note it is also possible to create a simultaneous image of thermal expansion of a sample by color coding the pixels according to a slope of the nanoTA curve during the heating step (e.g. region 50 in FIG. 3a.) In a further improvement it is possible to automatically clean the probe tip (step 82) after every measurement or after every Nth measurement, or as triggered by detection of tip contamination. Cleaning can be accomplished by withdrawing the probe tip from the sample and then rapidly heating the probe temperature above the temperature of decomposition of the contaminant. Silicon probes available from the current applicant can be heated to over 1200° C. to achieve tip cleaning. This temperature is above the decomposition and/or vaporization temperature of most organic materials present for example in polymers, biological and pharmaceutical samples. The presence of tip contamination may be detected, for example, by monitoring a flexural or torsional resonance of the cantilever. Torsional modes and especially higher order modes of oscillation are more sensitive to mass at the tip end. Probe contamination can also be detected by a statistically anomalous number of transition temperatures in the same range. In the case of a mixed material composite, random variations in sample structure would make it unlikely to have a large number of successive pixels to detect the transition temperature of one component and not the other. In the case of a large string of lower transition temperatures detected, conventional probability analysis can indicate the likelihood that the probe is contaminated. After a user selectable probability threshold is exceeded, an automatic cleaning step can be initiated.

TTM Imaging Time

TTM images to our knowledge have not been previously available despite the development of heatable AFM probes more than a decade ago. We believe there are two key factors associated with this lack of invention. The first is that prior art heatable probes, for example the Wollaston wire probe had a large radius. As such, these probes were typically confined to point measurements with contact areas typically limited to the scale of many microns. Additionally prior art measurements have been performed extremely slowly, such that a single heating cycle could take many seconds or even minutes, including the step of engaging the probe to the sample. Imagine then attempting to perform a 100×100 pixel image with a cycle time of 20 seconds per measurement point. This would require 200,000 seconds or over 55 hours of measurement time. Such a long imaging time is not practical and therefore spatially resolved transition temperature microscope images have not been available.

The current inventors have developed an instrument that can achieve 100×100 pixel transition temperature microscope images in a fraction of this time, including around 4.2 hours and as quickly as 6.7 minutes. This corresponds to TTM pixel rates of around 40 pixels per minute to 1500 pixels per minute. At such rates it also becomes possible to measure spatially resolved dynamic changes in materials. At 50×50 pixels, for example and 2000 pixels per minute, a new TTM image can be acquired every 1.25 minutes. This frame rate is fast enough to visualize some material dynamics including processes like curing, annealing, crystallization and other processes that induce thermomechanical changes on time scales of minutes to hours.

The total imaging time is given approximately by the following equation:

$$\text{Image time}=(\#X\text{ pixels})\times(\#Y\text{ pixels})\times(\text{engage time}+\text{heating time}+\text{withdraw time}+\text{cooling time}+\text{transition detection time}+XY\text{ move time})$$

The inventors have developed a system that is capable of performing a 100×100 pixel image in less around 7 minutes. In its most rapid operation, the tip is kept in constant interaction with the sample to eliminate the time needed for engage and withdraw steps. Because of the low thermal mass of the probes in combination with high slew rate electronics, the probe temperature can be ramped at rates up to 10,000° C./sec. For a typical ramp of around 100-200° C., the ramp time and cool time can each be less than 0.02 seconds. We have employed precision motorized actuators, for example from Zaber Industries, with a maximum translation speed of 4 mm/sec. For a typical sampling resolution of 10 um between pixels, this motion can be accomplished in 0.0025 seconds. Up to an 80 um move can be accomplished in the 0.02 seconds allocated for the probe cooling. The transition detection can be performed in parallel to the cooling and/or move time such that it does not increase the measurement time. With this arrangement, a 100×100 pixel transition temperature microscope image can be created in as little as (100× 100) (0.02 sec heat+0.02 sec cool)=400 seconds=6.7 minutes, or 1500 pixels per minute. This time is not unlike typical AFM imaging times, although with somewhat lower resolution. With more conservative temperature ramp rates of 1,000/sec, the 100×100 pixel image time can be taken in 67 minutes, or 150 pixels per minute. Or a 200×200 pixel TTM image can be taken at the high temperature ramp rate in around 27 minutes.

In some cases it is desirable to add an engage and withdraw step between each heating cycle. Using a nanopositioner and/or a motorized stage the probe tip can be lifted slightly above the sample, moved laterally and then re-engaged to the sample. This process avoids scanning the tip laterally while in contact with the sample and can minimize probe and sample damage. It also allows the process to accommodate larger roughness or sample tilt by resetting the contact point at each location. It is typically not necessary to lift the tip more than a few microns. For example, lifting the tip 10 microns for a 100 micron XY translation step will accommodate sample tilts of almost 6 degrees and sample roughness of many microns. Using a motorized actuator and/or a nanopositioner, a 10 um withdraw can be achieved in a few msec or less. Piezoelectric stacks, for example with a range of around 10 um, can have a resonant frequency in excess of 100 kHz. With a 100 ohm series resistance and a capacitance of ~200 nF, these actuators have an electrical time constant of ~20 microseconds. Combined with a mechanical resonance of 100 kHz, it is possible to achieve a full range motion in less than 0.1 msec (i.e. 5 electrical time constants or 10 mechanical resonant periods) without advanced control algorithms. Even with piezo amplifiers that only supply a fraction of the peak charging current, this piezo stack actuator can achieve final position in less than say 1 msec. Using the Zaber motorized actuator mentioned previously, a 10 micron withdraw can be accomplished in 2.5 msec. If low spring constant cantilever probes are used, for example <5 N/m, it may be possible to engage the probe without feedback. In this case, the engage process can be undertaken at full speed, i.e. less than a msec. If the engage/re-engage is performed under feedback, the slew rate of the feedback loop will limit the engage speed. Feedback loops in high-speed AFM systems, for example developed by Professor Toshio Ando of Kanazawa, Japan have operated at rates of order~1 mm/sec. For a 10 um engage, using such high speed feedback, the engage times can be of order 10 msec. So even with an engage and withdraw for each pixel, it is possible to achieve 100×100 pixel image in a total time of (100×100) (0.0001 sec engage+0.02 sec heat+0.02 sec cool+0.01 sec withdraw)=500 seconds=8.3 minutes. There are many variations of course in the timing budget to accommodate different heating/cooling rates and engage/withdraw times depending on tradeoffs of throughput versus image quality and other factors. For very conservative measurements at low temperature ramp rates, it may be desirable to spend as long as 4 hours, for example per TTM image. For example, one desirable scenario can be to allocate 0.6 secs each for the temperature ramp and tip engage and then 0.1 sec each for the withdraw, cooling and XY move step. In such a case TTM images can be acquired at approximately 40 pixels per minute and an image time of 4.2 hours for a 100×100 pixel image. Imaging at low rates like 40 pixels per minute allow low heating rates that can permit more accurate determination of transition temperatures and allow for very safe engage/withdraw procedures to prevent tip and sample damage. Even low rates like 40 pixels per minute are likely at least an order of magnitude faster than any previously available nanoscale thermal analysis. For precision work, it may be desirable to work at even slower pixel rates, for example at 20 pixels/minute. A 50×50 pixel image can still be accumulated at this rate in just over two hours.

Figure 5A:
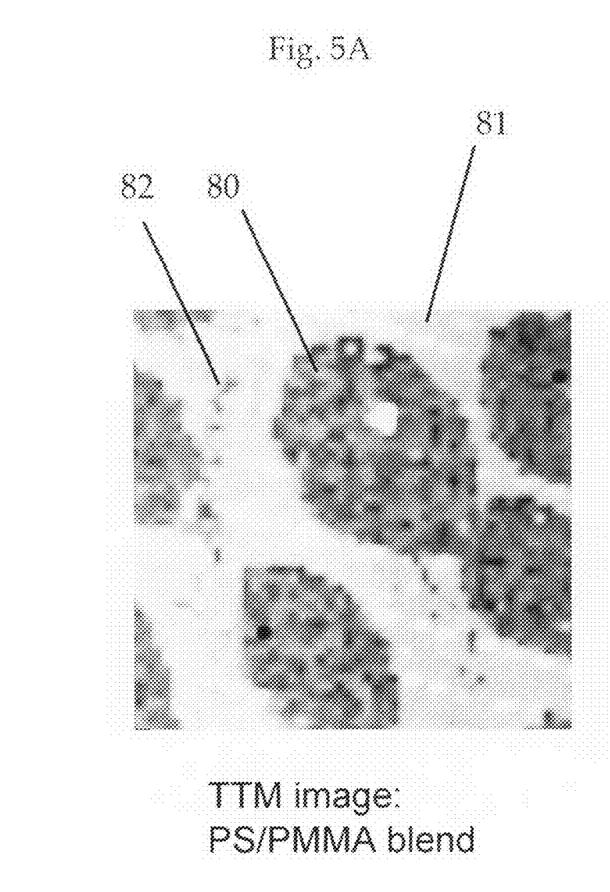
FIG. 5 is an example transition temperature microscope image of a blend of two polymer components.
Figure 5B:
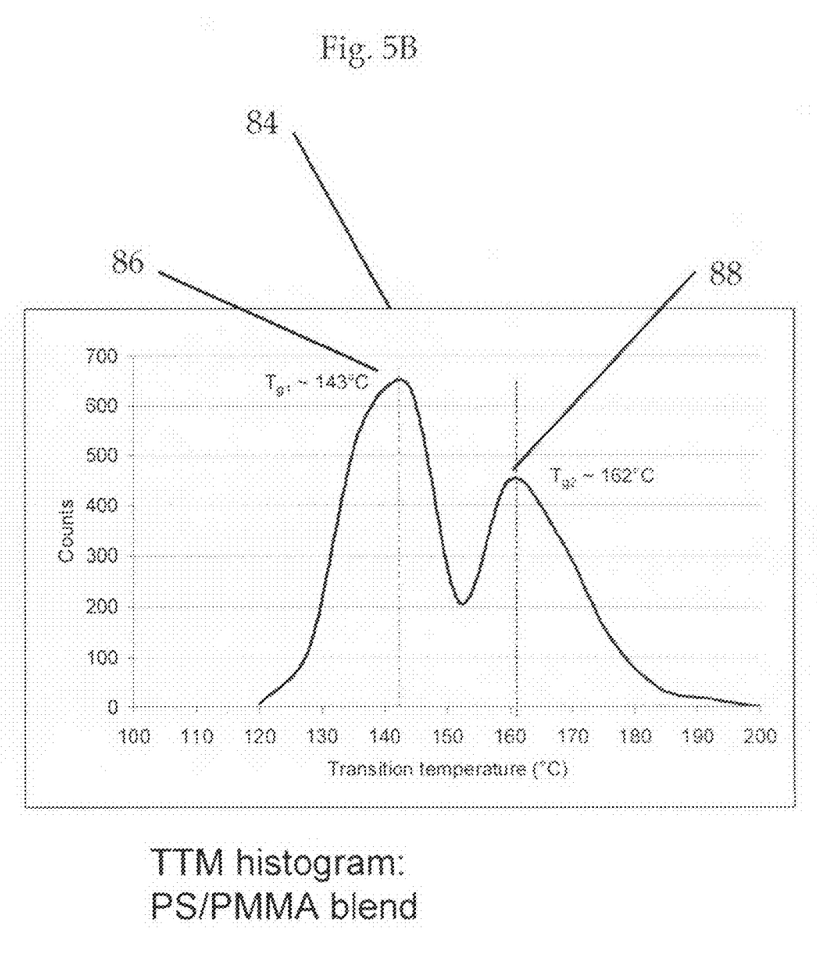

FIG. 5a is an example transition temperature microscope image of a blend of two polymer components, polystyrene (PS) and polymethylmethacrylate (PMMA). FIG. 5a shows a TTM image comprising a gray scale rendered image 81 of an array of $T_g$ measurements across the PS/PMMA blend. The gray scale TTM image clearly shows different domains corresponding to PS domains 80 within the PMMA matrix 82. FIG. 5b is a histogram 84 of the thermal transition temperatures acquired on the PS/PMMA sample measurements. The histogram 84 shows two clear peaks 86 and 88 corresponding to transitions centered on 143° C. and 162° C. for PS and PMMA respectively. Note that $T_g$ measurements are rate dependent and high speed TTM images show rates higher than bulk thermal analysis performed at very low heating rates.

Figure 6:
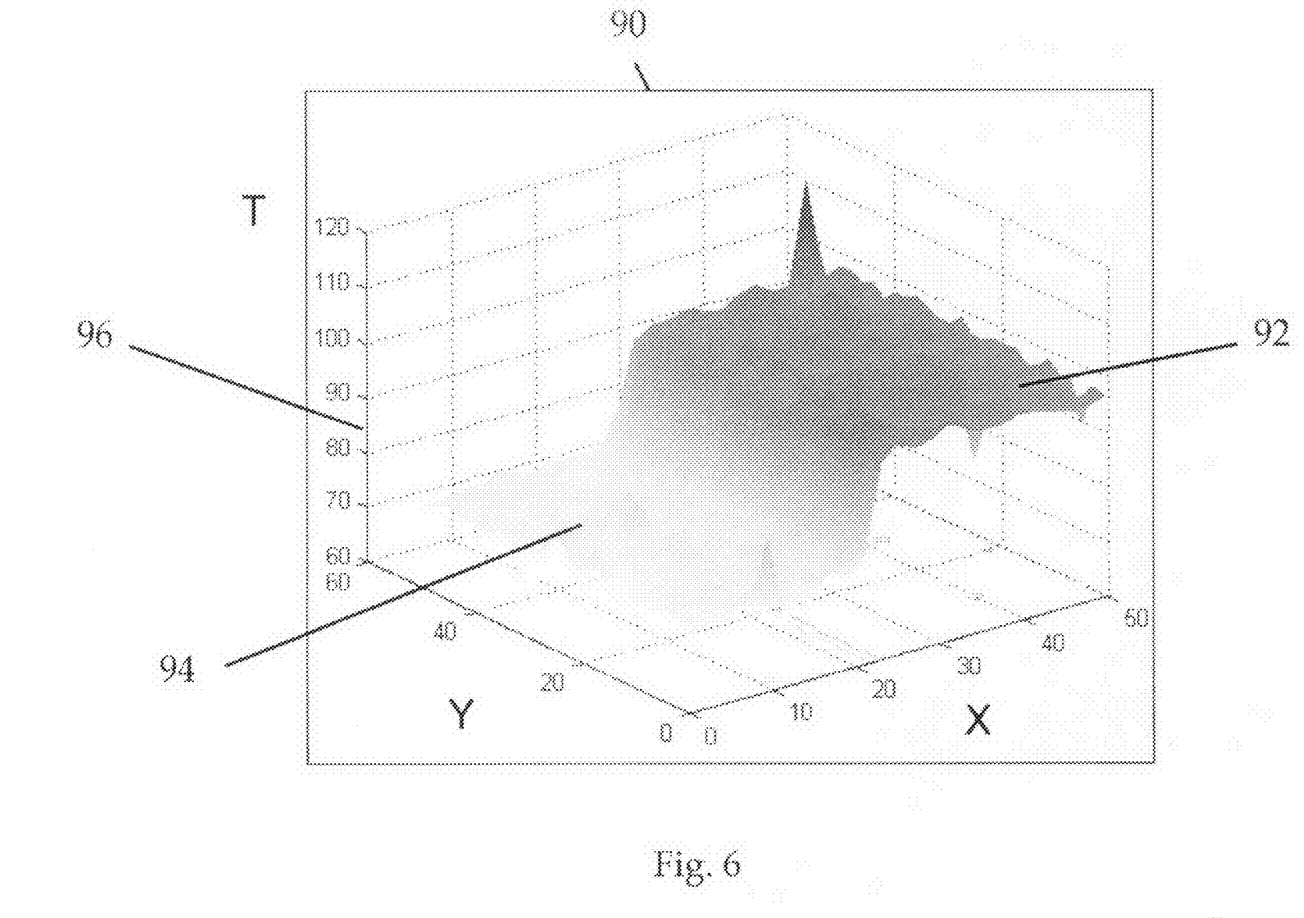
FIG. 6 is an example transition temperature map of an embedded epoxy sample.

FIG. 6 is an example transition temperature microscopy image across a boundary in an embedded epoxy sample. This TTM image 90 is a 3D perspective view of the data where the local transition temperatures are plotted on the vertical axis 96 versus the spatial XY dimensions. The TTM image clearly resolves the material boundary, resolving it into a region 92 with a high transition temperature and region 94 with a low transition temperature.

Figure 7:
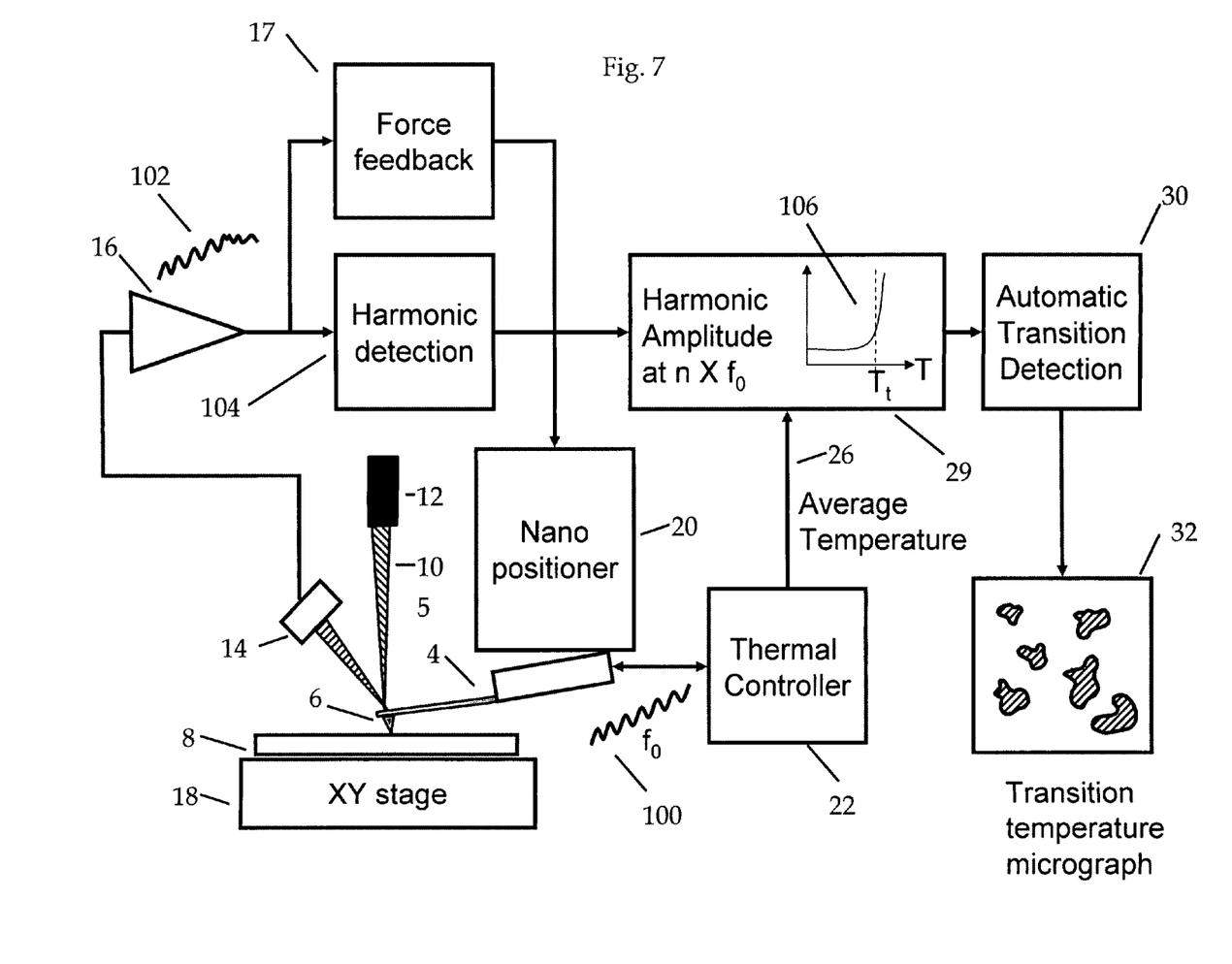
FIG. 7 shows a simplified schematic diagram of an apparatus for determining the transition an alternative embodiment of transition temperature microscopy employing an oscillatory heating profile.

FIG. 7 shows a simplified schematic of an alternative embodiment of transition temperature microscopy employing an oscillatory heating profile. This embodiment resembles the apparatus shown in FIG. 1 in most ways and the preceding discussion largely applies. In this embodiment, however, a thermal controller 22 supplies a heater control signal 100 that includes both an oscillating modulation and a ramp signal. The ramp signal serves to increase the average temperature over time until a transition is detected or until a maximum desired temperature is reached. A probe data signal 102 is measured to detect the probe's response to the excitation and the tip-sample interaction. The probe data signal may be the cantilever motion, deflection, oscillation amplitude, phase, frequency, quality factor, mode frequency or other metric that characterize the static or dynamic response of the probe.

The oscillating modulation serves to provide a highly sensitive technique for determining the onset of a thermal transition. The oscillating modulation is contains at least one periodic frequency $f_0$. Below a thermal transition, the sample 8 will expand in response to the periodic excitation to drive the cantilever tip 6 and cantilever 4 primarily at the same frequency $f_0$, with some level of higher harmonics present due to any non-linearity in the thermomechanical response of the cantilever and/or sample. Above a transition temperature $T_t$ 29, however, the sample may soften to allow slight penetration by the probe tip 6 into the sample 8 or at least a reduction in the amplitude of the cantilever's response. In this case there is a sharp onset of growth in the higher harmonics of the cantilever, i.e. an increase in amplitude of motion at frequencies corresponding to $N \times f_0$, where N is an integer. The amplitude of one or more of these harmonics at $N \times f_0$ can be plotted as shown in graph 106. Such analysis results in a clearly identifiable transition temperature $T_t$ 29 at the point at which the harmonics amplitudes grow.

The amplitude of one or more harmonics can be detected with harmonic detector 104. Harmonic detection can be accomplished in numerous ways. Analog and/or digital lock-in amplifiers may be used to isolate signals at a reference frequency N times the modulation frequency. Alternately, Fourier techniques can be used to measure amplitudes at frequencies centered around N times the modulation frequency. Additionally techniques like harmonic inversion, tone detection, and curve fitting techniques can be used to analyze time varying probe signal data to measure harmonic amplitudes.

Figure 8:
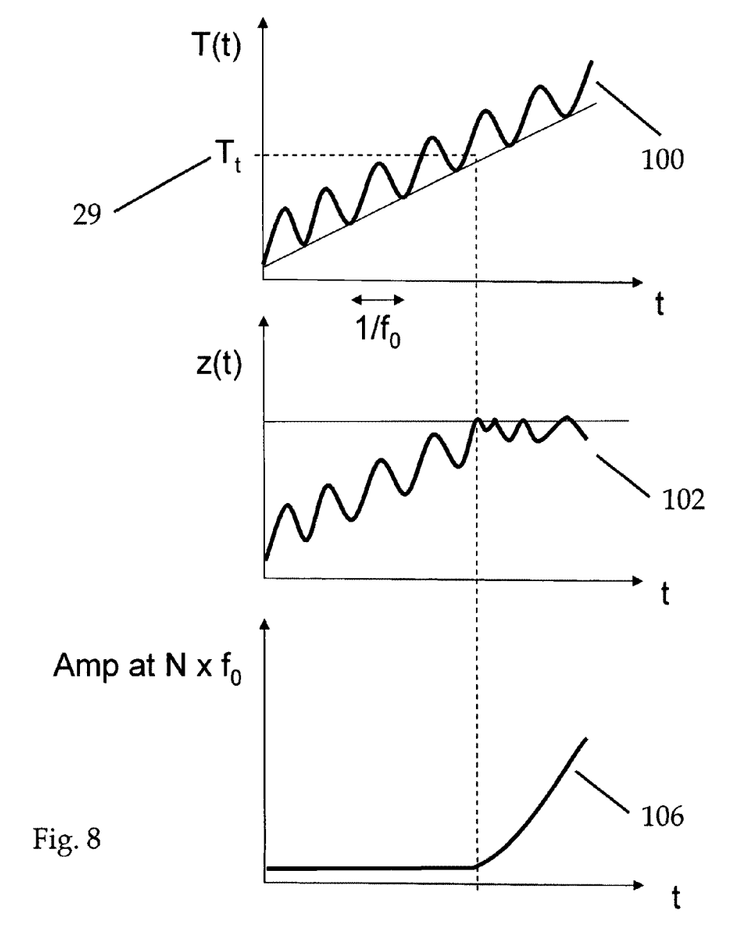
FIG. 8 is a simplified diagram showing a method of determining a transition temperature from the apparatus of FIG. 7.

Alternatively, it is possible to measure other dynamic properties of the probe to detect the onset of a thermal transition and the associated thermal transition temperature. For example as shown in FIG. 8, the phase shift between the heater control signal 100 and the probe data signal 102. The phase shift of an oscillating AFM cantilever is often related to the energy dissipation in the tip-sample interaction. In many cases this signal may be sensitive to changes in mechanical properties of a sample associated with a thermal transition. Similarly, measurements of oscillation amplitude, quality factor, contact resonance mode frequency, dynamic contact stiffness, storage modulus, loss modulus, or similar mechanical properties can be used as indicators of a thermal transition.

We claim:

1. A method of creating a transition temperature microscope image of local thermal transitions, the method comprising the steps of:
   a. Providing a heatable cantilever probe with a sharp tip that can be heated at a rate greater than 50 degrees C/sec;
   b. Engaging the probe tip within an elapsed time of less than one second to interact with a measurement point on a sample;
   c. Heating the cantilever probe while positioned at the measurement point and further while measuring at least one probe data signal;
   d. Withdrawing the probe tip and translating the probe relative to the sample to move the probe to a new measurement point within an elapsed time of less than one second;
   e. Repeating steps b-d at an array of measurement points on the sample;
   f. Using at least one algorithm, executing on a digital computation device, to automatically analyze probe data signals from a plurality of measurement points from the array to identify thermal phase transitions.

2. The method of claim 1 wherein the array of measurement points are accessed by creating relative tip-sample motion using an atomic force microscope.

3. The method of claim 1 wherein array of measurement points are accessed by creating relative tip-sample motion a motorized translation stage.

4. The method of claim 1 wherein the array of measurement points are accessed by creating relative tip-sample motion using a nanopositioning stage.

5. The method of claim 1 wherein an analysis algorithm determines the transition temperatures automatically by detecting a threshold level in local slope of a deflection versus temperature curve.

6. The method of claim 5 in which the deflection versus temperature curve is a smoothed curve fit to the probe data.

7. The method claim 5 in which the deflection versus temperature data is filtered to reduce noise and increase accuracy of the determination of thermal transition temperatures.

8. The method of claim 1 further comprising the step of assembling the plurality of thermal transition temperatures into a spatially resolved image of thermal transition temperatures.

9. The method of claim 8 wherein the spatially resolved image comprises a spatial resolution of better than 1 um.

10. The method of claim 8 wherein the spatially resolved image is acquired at a rate of at least 20 pixels per minute.

11. The method of claim 8 wherein the spatially resolved image is acquired at a rate of at least 40 pixels per minute.

12. The method of claim 8 wherein the spatially resolved image is acquired at a rate of at least 150 pixels per minute.

13. The method of claim 8 wherein the spatially resolved image is acquired at a rate of at least 500 pixels per minute.

14. The method of claim 8 wherein the spatially resolved image is acquired at a rate of at least 1500 pixels per minute.

15. The method of claim 8 further comprising the step of identifying materials components in a multi-component blend using transition temperatures from the spatially resolved image.

16. The method of claim 1 wherein the heating step comprises applying an oscillatory modulation signal to the probe to oscillate the temperature of the region of the sample.

17. The method of claim 16 further comprising the step of detecting an amplitude of oscillation of a probe signal at a least one harmonic frequency of the oscillatory modulation signal.

18. The method of claim 17 wherein the automatic analysis comprises using the amplitude of a probe signal at the at least one harmonic frequency to determine the plurality of thermal transition temperatures.

* * * * *